United States Patent [19] … [11] 4,413,680
Sandiford et al. … [45] Nov. 8, 1983

[54] PERMEABILITY REDUCTION IN SUBTERRANEAN RESERVOIRS

[75] Inventors: Burton B. Sandiford, Placentia; Hoai T. Dovan, Fullerton; Richard D. Hutchins, Placentia, all of Calif.

[73] Assignee: Union Oil Company of California, Los Angeles, Calif.

[21] Appl. No.: 332,940

[22] Filed: Dec. 21, 1981

[51] Int. Cl.³ ............... E21B 43/22; E21B 33/138
[52] U.S. Cl. ............... 166/270; 166/294; 166/273; 166/295
[58] Field of Search ........... 166/270, 294, 295, 273, 166/274

[56] References Cited

U.S. PATENT DOCUMENTS

| | | | |
|---|---|---|---|
| 3,687,200 | 8/1972 | Routson | 166/275 |
| 3,762,476 | 10/1973 | Gall | 166/294 |
| 3,825,067 | 7/1974 | Vestal | 166/275 |
| 3,841,399 | 10/1974 | Ryan | 166/270 X |
| 3,949,811 | 4/1976 | Threlkeld et al. | 166/270 X |
| 4,009,755 | 3/1977 | Sandiford | 166/270 |
| 4,043,922 | 8/1977 | Palmer et al. | 166/274 X |
| 4,069,869 | 1/1978 | Sandiford | 166/270 |
| 4,332,297 | 6/1982 | Sandiford | 166/270 |

*Primary Examiner*—Stephen J. Novosad
*Attorney, Agent, or Firm*—Gerald L. Floyd; Gregory F. Wirzbicki; Dean Sanford

[57] ABSTRACT

A method for selectively reducing the permeability of the higher permeability zones of a subterranean reservoir having heterogeneous permeability, such permeability reduction occurring a substantial distance away from a well in which there is injected into the reservoir an aqueous solution or solutions of a water-soluble polymer, a material capable under certain conditions of at least partially cross-linking the polymer to form a gelatinous precipitate, and a water-soluble alkaline material in an amount sufficient to maintain the pH of the polymer-containing composition above about 9 until the composition has passed a substantial distance through the reservoir.

25 Claims, No Drawings

PERMEABILITY REDUCTION IN SUBTERRANEAN RESERVOIRS

BACKGROUND OF THE INVENTION

1. Field of the Invention

This invention relates to a method for reducing the permeability of the more permeable zones of a subterranean reservoir having nonuniform permeability, and more particularly, to such a method wherein permeability reduction is caused to occur only after an injected composition or compositions has passed radially into the reservoir a substantial distance from the well.

2. Description of the Prior Art

It has long been recognized that when fluids are passed through a subterranean reservoir having heterogeneous permeability, for example during an enhanced recovery process or during production of fluids from a well, a relatively higher volume of fluids tends to pass through the more permeable strata with little or no fluid passing through the less permeable strata.

It is known to attempt to even out the flow of fluids through such reservoirs, i.e., increase the proportion of the fluids flowing through the less permeable portions of the reservoir, by injecting into the reservoir a fluid which predominantly enters the more permeable strata where it subsequently thickens and/or at least partially sets to reduce the permeability of these more permeable sections and in some cases plug them completely. Thus, a higher proportion of any fluid subsequently passed through the reservoir will flow through the portions of the reservoir which originally were less permeable.

Among the permeability-reducing and/or plug-forming compositions which have been used are aqueous solutions or dispersions of polymers containing a cross-linking agent. For example, U.S. Pat. Nos. 4,009,755 and 4,069,869 to Sandiford each deals with forming plugs in wells wherein there is injected various combinations of: (a) an aqueous solution of a water-soluble polymer, e.g., polyacrylamide, (b) a cross-linking material that reacts with the polymer to form a polymer-containing plug, e.g., a compound of a multivalent metal and a reducing agent, a low molecular weight water-soluble aldehyde or a colloidal hydroxide of a multivalent cation, (c) an aqueous solution of an alkali metal silicate and (d) a gelling agent that reacts with the silicate to form a silicate-containing plug, e.g., acid and acid-forming compounds, water-soluble ammonium salts, lower aldehydes and aluminates. In the compositions described in each of these references, a large amount of alkali metal silicate is present, and this material becomes a part of the plug.

U.S. Pat. No. 3,687,200 to Routson describes a method for controlling the flow of aqueous fluids in a porous subterranean formation using an aqueous colloidal dispersion of a water-insoluble inorganic compound, such as aluminum hydroxide, prepared in an aqueous solution of a synthetic organic polymeric polyelectrolyte, e.g., a polyacrylamide, without a cross-linking agent. In one method of preparing the dispersion, a small amount of an alkali metal hydroxide or of an alkaline buffer is dissolved in the polymer solution. Thereafter, a dilute solution of a suitable metallic salt, such as a soluble salt of aluminum, e.g., sodium aluminate, is added to the polymer solution to precipitate aluminum hydroxide in the form of a stable colloidal dispersion of the insoluble aluminum hydroxide. The resulting composition has a high resistance factor, i.e., a high pressure drop when forced through a permeable core. An alternative method of preparing the dispersion involves addition of a precipitant such as sodium sulfide to the composition instead of the alkali metal hydroxide. Also, in certain cases, the composition containing the colloidal dispersion is generated inside a subterranean formation. Specifically, if the connate water contains soluble sulfide ions, a solution of a metallic salt in an aqueous solution of polymer is injected to form the colloidal insoluble metallic sulfide in the interstices of the formation. Otherwise, the dispersion plugging agent is produced before the composition is injected into the formation, thereby promoting plugging at the well sidewall and in the immediate vicinity of the well rather in the formation a substantial distance from the well.

U.S. Pat. No. 3,841,399 to Ryan describes forming in situ a polymer-thickened aqueous waterflooding composition by injecting into a formation a low viscosity, potentially hydrolyzable, synthetic aqueous emulsion polymer, such as a water dispersion of acrylonitrile copolymerized with ethyl acrylate, and an aqueous solution of sodium hydroxide. The polymer is eventually hydrolyzed in the subterranean formation to form a high viscosity composition. The caustic solution can be added in admixture with the polymer composition or separately following the polymer composition. No cross-linking agent is employed.

U.S. Pat. No. 3,825,067 to Vestal describes a method for dissolving a polyacrylamide polymer in water to form a composition useful as a secondary recovery drive fluid. The powdered polymer is mixed with dilution water, the pH adjusted to 7 to 14 by the addition of a base such as sodium hydroxide or trisodium phosphate, and the resulting solution heated to simultaneously hydrolyze and solubilize the polymer. No cross-linking agent is utilized. The composition does not form a plug in the reservoir or otherwise alter reservoir permeability, but rather functions as a drive fluid to displace oil from the reservoir.

While each of the aforementioned treatments has met with some success in particular applications, the need exists for a further improved well treating process to selectively reduce the permeability of the more permeable strata of a reservoir having heterogeneous permeability, especially in such strata a substantial distance from a well penetrating the strata. Moreover, the prior art processes often encounter practical difficulties. For example, in those processes employing a polymer and cross-linking agent, if the two materials are mixed together in an aqueous solution at the surface, they tend to begin to react immediately. By the time the resulting composition is pumped down a well and into a reservoir, the composition often has already begun to increase in viscosity and may be difficult to force into even the higher permeability strata. The same is true to a lesser extent if separate aqueous solutions of polymer and cross-linking agents are simultaneously pumped down a well and mix as they pass through the tubing. If one of the compositions is pumped first followed by the second, there is less chance of reaction occurring until after the compositions have entered the reservoir. However, mixing of separately injected compositions in a reservoir is difficult to control. What is desired, therefore, is a composition capable of reducing permeability and injectable down a well and into a reservoir as a low viscosity, easily-pumped liquid. Then, after the composition has been injected through the reservoir some distance away from the well, it reacts to form a viscous, permeability-reducing composition or plug.

Accordingly, it is a principal object of the invention to provide a method for reducing the permeability to fluids of the more permeable strata of a reservoir having heterogeneous permeability.

It is a further object of this invention to provide such a method wherein the permeability reduction occurs a substantial distance in all directions from a well penetrating such reservoir.

It is a still further object of this invention to provide such a method wherein the permeability reduction is achieved by injecting into the reservoir via a well a relatively low viscosity aqueous base composition which reacts to form a relatively high viscosity composition and/or plug only after passing a substantial distance through the reservoir.

Another object of this invention is to provide such a method wherein the location of a plug formed in a reservoir can be controlled.

Other objects, advantages and features of the invention will be apparent from the following description and claims.

SUMMARY OF THE INVENTION

Briefly, the invention provides a method for reducing the permeability of the higher permeability zones of a subterranean reservoir having heterogeneous permeability, which permeability reduction occurs at a substantial distance away from a well penetrating the reservoir, wherein there is injected into the reservoir via the well an aqueous solution or solutions of a water-soluble or water-dispersible polymer, a material which, at a pH of about 9 or below, is capable of at least partially cross-linking the polymer to form a gelatinous precipitate, and a compound which will release hydroxyl ions in aqueous solution, e.g, a water-soluble alkaline material in an amount and concentration sufficient to maintain the pH of the polymer-containing composition above about 10 until the said composition has passed a substantial distance through the reservoir.

Due to its wetting characteristic, the injected solution preferentially passes into those strata having higher water permeabilities. The gels or solid precipitates which are formed in the higher permeability zones cause them to become at least partially plugged. As the permeability of these more permeable zones is reduced, the injected solution tends to pass to a greater extent into the less permeable zones causing permeability reduction therein. As a consequence, a reservoir containing strata or zones of nonuniform permeability with respect to water is rendered more uniformly permeable.

The permeability control technique of this invention is particularly useful in conjunction with enhanced recovery processes, such a waterflood or steam drive, wherein the permeability adjusting treatment can be periodically performed as necessary to achieve the desired uniformity. In another embodiment of the invention, the aforementioned permeability-reducing solution is injected into a producing well in order to plug the permeable water channels in communication therewith.

DETAILED DESCRIPTION OF THE INVENTION

In the method of the invention for reducing the permeability or plugging of the more permeable zones of a subterranean reservoir having heterogeneous permeability, there is injected into the reservoir an aqueous solution or dispersion of (a) a water-soluble or water-dispersible polymer, (b) a material capable of at least partially cross-linking the polymer at a pH of about 9 or below to form a gelatinous precipitate, and (c) a compound which will produce hydroxyl ions in aqueous solution, e.g., a water-soluble alkaline material in an amount and concentration sufficient to raise the pH of the polymer-containing composition above about 10. As the composition passes through the reservoir, the pH of the composition falls as the alkaline material reacts with materials present in the reservoir or forms deposits on the reservoir rock with which it comes in contact, or the composition is diluted by reservoir fluids having a pH below about 9.

The aqueous polymer solution employed in the treatment of this invention is a dilute solution of a water-soluble or water dispersible polymer in fresh water or brine, whose setting or gellation can be time-delayed. A number of water soluble polymers are known to form viscous aqueous polymer solutions when dissolved therein in relatively dilute concentrations. Exemplary water-soluble polymeric materials that can be employed are relatively high molecular weight acrylic acid-acrylamide copolymers, polyacrylamides, partially hydrolyzed polyacrylamides, polyalkyleneoxides, ammonium or alkali metal salts of carboxyalkylcelluloses, hydroxyethylcelluloses and heteropolysaccharides obtained by the fermentation of starch-derived sugar.

Many of the water-soluble polymers useful in the practice of this invention are characterized by a viscosity of at least 3 centipoises for a 0.1 parts by weight solution thereof in an aqueous 3 parts by weight sodium chloride solution at 25° C. as determined with a Brookfield viscometer equipped with a UL adapter and operated at a speed of 6 r.p.m. However, it is to be recognized that other of the water-soluble polymers, such as certain polyacrylamides and polyalkyleneoxides, are effective in reducing the mobility of water in porous media, yet have little or only slight effect upon the viscosity of water or brine.

The polyacrylamide and partially hydrolyzed polyacrylamide which can be used in this invention include the commercially available, water-soluble, high molecular weight polymers having molecular weights in the range of above about $0.2 \times 10^6$, preferably from $0.5 \times 10^6$ to $40 \times 10^6$, and more preferably from $3 \times 10^6$ to $20 \times 10^6$. The hydrolyzed polyacrylamides have up to about 70 percent of the carboxamide groups originally present in the polyacrylamide hydrolyzed to carboxyl groups. Preferably from about 12 to about 45 percent of the carboxamide groups are hydrolyzed to carboxyl groups. Hydrolysis of the acrylamide polymer is accomplished by reacting the same with sufficient aqueous alkali, e.g., sodium hydroxide, to hydrolyze the desired number of amide groups present in the polymer molecule. The resulting products consist of a long hydrocarbon chain, with some carbon atoms bearing either amide or carboxyl groups. Copolymerization of acrylic acid and acrylamide according to well known procedures produces acrylic acid-acrylamide copolymers. The term "hydrolyzed polyacrylamide," as employed herein, is inclusive of the modified polymers wherein the carboxyl groups are in the acid form and also of such polymers wherein the carboxyl groups are in the salt form, provided that the salts are water-soluble. Alkali metal and ammonium salts are preferred. A number of polyacrylamides and partially hydrolyzed acrylamide polymers and acrylic acid-acrylamide copolymers suitable for use in this invention are commercially available; for example, WC-500 polymer marketed by Calgon Corporation of Pittsburgh, Pa., Pusher 700 polymer marketed by The Dow Chemical Company of Midland, Mich., Q-41-F polymer marketed by Nalco Chemical Company of Oak Brook, Ill. and Cyanatrol 940 polymer marketed by American Cyanamid of Wallingford, Conn.

Especially useful in the practice of this invention are the partially cationic polyacrylamides, the partially anionic polyacrylamides and mixtures thereof. A partially cationic polyacrylamide is a nonionic polyacrylamide which contains a cationic co-monomer, such as an alkylene polyamine, a quaternary ammonium chloride or amine hydrochloride, for example trimethyl octyl ammonium chloride, trimethyl stearyl ammonium chloride, oleyl trimethyl ammonium chloride, oleyl amine diethylamine hydrochloride and dimethylaminopropylamine. A partially anionic polyacrylamide can be a nonionic polyacrylamide which has been partially hydrolyzed to convert some of the acrylamide groups to acrylic groups, the alkali metal salts of which are anionic. Introducing sulfate or sulfonate groups into the polyacrylamide molecule also imparts an anionic character to the molecule. Polymer 1160 is a 20 percent by weight cationic, 80 percent nonionic copolymer marketed by Betz Laboratories, Inc. of Trevose, Pa. Polymer 1120 and Hi Vis polymer are 35 percent anionic, 65 percent nonionic polyacrylamides which have been partially hydrolyzed to the extent of 35 percent. These polymers are also marketed by Betz Laboratories, Inc.

The operable polyalkeneoxides have molecular weights in the range of from about $10^6$ to $10^8$, preferably from $10^6$ to $10^7$ and most preferably from $3 \times 10^6$ to $10 \times 10^6$. By "polyalkeneoxide" is meant herein any of the polymeric water-soluble resins prepared by homopolymerization of a single alkene oxide, for example ethylene oxide, propylene oxide or butylene oxide. It is preferred to employ the homopolymer of polyethylene oxide. This product is marketed by Union Carbide Corporation under the trademark "Polyox." Mixed polyalkeneoxides, made by heteropolymerization of more than one alkene oxide in either a random or block polymerization, may also be employed.

Also suitable for use in this invention are the alkali metal or ammonium salts of a carboxyalkylcellulose, such as carboxymethylcellulose. Carboxymethylcellulose may be represented by the formula:

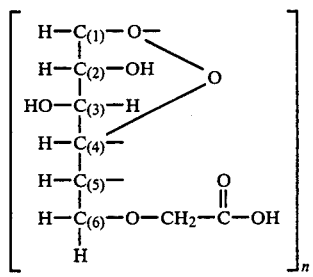

where n is a whole number greater than one, and the carboxymethyl anhydroglucose units are connected together by oxygen bridges between carbon atom (1) of one unit and carbon atom (4) of another unit. A salt of carboxymethylcellulose is carboxymethylcellulose wherein the H at the end of the carboxymethyl group in one or more of the carboxymethyl and anhydroglucose units is replaced by a cation. In any molecule or group of molecules of carboxymethylcellulose, each anhydroglucose unit need not necessarily contain a carboxymethyl group although one or more anhydroglucose units may contain up to three carboxymethyl groups, the additional carboxymethyl groups being substituted for the H's of the OH groups on carbon atoms (2) and (3). As used herein, the term "carboxymethylcellulose" is defined as any carboxymethylcellulose having a degree of substitution less than one wherein the number of anhydroglucose units exceeds the number of carboxymethyl groups. Commercial grades of carboxymethylcellulose have a degree of substitution ordinarily between 0.5 and 0.9.

Hydroxyethylcellulose can be prepared from shredded wood pulp which has been soaked in 30 weight percent sodium hydroxide for about 20 hours. The resultant alkali cellulose is reacted with either ethylene oxide or ethylene chlorohydrin until a sufficient number of ethylene groups per glucose unit have been combined. The water-soluble form of hydroxyethylcellulose useful in this invention has a substitution (hydroxyethyl groups per glucose unit) greater than about 0.5, and preferably from 1.0 to 2.0. This is in contrast to the alkali-soluble form of hydroxyethylcellulose which has a substitution less than about 0.3. Generally, about 4 to 5 hours are required at about 40° C. for complete reaction of the alkali cellulose with the ethylene compound to produce a water-soluble hydroxyethylcellulose. The product is available commercially as either a solid fibrous material or in the form of aqueous solutions having up to about 10 weight percent hydroxyethylcellulose and viscosity ranges from about 10 to 1200 centipoises. A very high molecular weight hydroxyethylcellulose suitable for use in this invention is marketed by Hercules Inc. under the trademark Natrosol 250. Another suitable hydroxyethylcellulose is marketed by the Union Carbide Corportion under the trademark Cellosize.

A particularly useful water-soluble cellulose ether is carboxymethylhydroxyethylcellulose, CMHEC, in which part of the carboxymethyl groups of carboxymethylcellulose are replaced with hydroxyethyl groups following well-known procedures. It is preferred that the carboxymethyl degree of substitution be at least 0.4. The degree of hydroxyethyl substitution is less important and can vary widely, e.g., from about 0.1 to 0.4 or higher. A suitable CMHEC is marketed by Hercules Inc. under the trademark SPX 5338.

The heteropolysaccharides which may be used in carrying out the present invention are ionic polysaccharides produced by fermentation of carbohydrates by bacteria of the genus Xanthomonas. Examples of such heteropolysaccharides are those produced by *Xanthomonas campestris, Xanthomonas begonia, Xanthomonas phaseoli, Xanthomonas hederae, Xanthomonas incanae, Xanthomonas carotae* and *Xanthomonas translucens*. Of these, ionic polysaccharide B-1459 is preferred. The polysaccharide B-1459 is prepared by culturing the bacterium *Xanthomonas campestris* NRRL B-1459, U.S. Department of Agriculture, on a well-aerated medium containing commercial glucose, organic nitrogen sources, dipotassium hydrogen phosphate and various trace elements. Fermentation is carried to completion in four days or less at a pH of about 7 and a temperature of 28° C. Polysaccharide B-1459 is available under the trademark Kelzan MF marketed by Kelco Company of San Diego, Calif. Production of this heteropolysaccharide is well described in Smiley, K. L. "Microbial Polysaccharides-A Review," *Food Technology* 20, 9:112-116 (1966) and Moraine, R. A., Rogovin, S. P. and Smiley, K. L. "Kinetics of Polysaccharide B-1459 Synthesis," *J. Fermentation Technology* 44, 311-312 (1966).

The selected water-soluble polymer is admixed with water or brine to provide a relatively dilute aqueous solution of the polymer that exhibits a sufficiently reduced mobility when injected into the porous media to divert subsequently injected fluids to the less permeable channels. Preferably, the polymer is dissolved in fresh water since the mobility reduction effect of most of these polymers is inhibited by the presence of substantial quantities of dissolved salts. However, it is sometimes desirable to employ oil-field brine or other water containing relatively high dissolved salt contents, particularly where the reservoir into which they are to be injected is water-sensitive or where fresh water is not available. In most instances, the mobility of the water can be reduced to the desired level by the addition of about 0.0025 to about 1 parts by weight of the polymer, and satisfactory results can often be obtained by the addition of 0.02 to 0.5 parts by weight of polymer.

The material which reacts with the polymer at a pH of about 9 or below to produce a polymer-containing plug are those which at least partially cross-link the polymer to form a gelatinous precipitate. Suitable cross-linking agents used in an amount sufficient to promote cross-linking of the polymer are an alkali metal or ammonium aluminate or tungstate. Suitable materials include sodium aluminate, potassium aluminate, ammonium aluminate, sodium tungstate, potassium tungstate and ammonium tungstate. Broadly, the amount of cross-linking agent to be used can range from about 0.0005 to 1 part by weight of the aqueous solution or dispersion. Preferably about 0.01 to 0.2 part by weight of the aqueous solution or dispersion is employed.

While by careful selection of particular polymers and cross-linking agents, the cross-linking reaction can be somewhat delayed, in most instances the cross-linking reaction tends to start as soon as the components are mixed. Where such solutions are to be used as part of a well treating process, it would be highly desirable if the cross-linking reaction could be delayed so that the solution would not substantially increase in viscosity until the solution had been prepared at the surface, perhaps transported from a mixing location to a well location, pumped down a well and pumped out into the reservoir a substantial distance from the well. If a plug is formed close to the injection well, e.g., less than about 20 feet from the well, subsequently injected fluids will require an undesirably high injection pressure, reducing the injection rates to undesirably low levels. Also, if permeability reduction occurs relatively close to the well, and only a small volume of permeability reducing composition is used, it is relatively easy for subsequently injected fluids to by-pass the portions of the reservoir containing the permeability reducing composition and the desired permeability control in the reservoir may be lost. It would be highly desirable if the permeability reduction could be achieved in the reservoir at a distance of about 20 feet or beyond from a well, for example, about 20 to 200 feet from a well. If the permeability reduction is achieved in the area immediately surrounding the well out to about 20 feet away from the well, the flow path of fluids subsequently injected via the well, as during an enhanced recovery process, will be highly restricted. The injection pressure required may become undesirably high. Also, once a flow path has been established through this relatively small area having reduced permeability in the immediate vicinity of the well, the effectiveness of the plug is largely lost.

An aqueous solution of a water-soluble or water-dispersible polymer and a cross-linking agent has a pH of about 8.7 to 9.25. However, the pH varies with concentration, type of water and polymer. It has been found if the pH of such a solution is raised to about 9 or above, more particularly, 9.2 or above, as by the addition of an alkaline material, no cross-linking reaction occurs even 30 or more days after mixing.

The compound suitable for releasing hydroxyl ions in aqueous solution, e.g., the water-soluble alkaline materials, may be selected from the group consisting of alkali metal and ammonium hydroxides, alkali metal silicates and alkali metal phosphates. Sodium hydroxide is the preferred hydroxide. Sodium silicate is the most commonly used alkali metal silicate. Any sodium silicate having a ratio of silica to sodium oxide of from about 1.5:1 to 4:1 by weight can be used. Preferably, the ratio should be from about 3:1 to 3.5:1. Examples of alkali metal phosphates which can be used include monobasic sodium phosphate, dibasic sodium phosphate and trisodium phosphate. The alkaline material is employed in a concentration of about 0.1 to 0.5 parts by weight of the aqueous solution or dispersion. Sufficient alkaline material is added to raise the initial pH of the polymer- and cross-linking agent-containing solution to 10 or above. For example, at such a pH, the aluminum in an aluminate cross-linking agent does not function as a cross-linking agent. As the composition passes through the reservoir, the pH slowly decreases. When the pH reaches about 9 or below, more particularly 9.2 or below, the aluminum in the aluminate is released as free, trivalent aluminum which is rapidly taken up to form insoluble aluminum hydroxide. During this transition, the aluminum is available to function as a cross-linking agent.

In order to further the lowering of the pH of an injected aqueous solution or dispersion used in the method of this invention to promote cross-linking of the polymer, it is optional, anytime following the injection of the aqueous solution or dispersion, to inject into the subterranean reservoir a gas, the aqueous solution of which has an acid pH. Suitable gases include carbon dioxide, hydrogen sulfide, sulfur dioxide and sulfur trioxide.

The order of mixing of the ingredients of the treating solution is not critical as long as the mixing of the alkaline material is not unduly delayed following contact of the polymer with the cross-linking agent. Preferably the alkaline material is added to water, followed by the aluminate and finally the polymer. The treating solution is employed in an amount of about 2 to 800 barrels per vertical foot of strata to be treated.

The invention is further illustrated by the following examples which are illustrative of various aspects of the invention and are not intended as limiting the scope of the invention as defined by the appended claims.

EXAMPLES 1 to 11

A series of tests is made to determine the effect of pH on the gelling of polymer solutions containing a cross-linking agent. A stock solution of polymer is prepared by mixing into 400 milliliters of water about 6 milliliters of Cyanatrol 960-S, containing 30 percent by weight active solution of a 28 percent hydrolyzed polyacrylamide polymer having a molecular weight of about 15 million, marketed by American Cyanamid Company of Wallingfort, Conn. This results in a solution containing 0.5 percent by weight active polymer. 25 milliliter aliquots of this polymer solution are placed in each of a first series of 2 ounce jars, numered 1 to 11, along with various amounts of an aqueous solution of hydrochloric acid to form a first series of solutions having a pH varying from 6.72 to 8.33 as shown in Table I. A stock solution of sodium hydroxide is prepared by mixing 2.5 grams of sodium hydroxide in 250 milliliters of water. In a second series of 2 ounce jars, numbered 12 to 22, there is mixed 0.025 grams sodium aluminate cross-linking agent and various amounts of both water and the stock sodium hydroxide solution to form a second series of solutions having a pH varying from 9.65 to 12.80 as shown in Table II. The contents of each polymer-containing solution is then mixed with the contents of a sodium aluminate- and sodium hydroxide-containing solution to form a series of solutions, Examples 1 to 11, containing polymer, cross-linking agent and alkaline material having varying pH. The mixtures are observed for cross-linking, i.e., gel formation. The results of the mixing are summarized in Table III.

At a pH above about 9.2, the solutions remain clear with no gel formation. At a pH below about 9.2, a gel forms immediately indicating cross-linking of the polymer occurs. Example 5, which has a final pH of below 9.2, i.e., 9.14 remains ungelled. This example contains, in part, jar 12, an aqueous solution containing both a cross-linking agent and an alkaline material and having an initial pH of only 9.65. Thus, in order to form a gel, it is necessary not only that the final pH of the composition be below about 9.2, but also that the initial pH of the aqueous solution containing both a cross-linking agent and an alkaline material be at least about 10 or above. After 4 days storage at room temperature, the Examples in which no gel forms initially remain clear and the Examples in which a gel forms initially remain gelled.

TABLE I

| | POLYMER CONTAINING SOLUTIONS | | |
|---|---|---|---|
| Jar Number | Amount Aqueous Solution of Hydrochloric Acid (milliliters) | Total Volume (milliliters) | pH |
| 1 | 0 | 25.0 | 8.33 |
| 2 | 4.0* | 29.0 | 7.85 |
| 3 | 5.5** | 30.5 | 7.95 |
| 4 | 9.0** | 34.0 | 7.75 |
| 5 | 13.0* | 38.0 | 7.02 |
| 6 | 13.0* | 38.0 | 6.72 |
| 7 | 18.5** | 43.5 | 7.50 |
| 8 | 18.5** | 43.5 | 7.25 |
| 9 | 20.0* | 45.0 | 6.75 |
| 10 | 20.0* | 45.0 | 6.9 |
| 11 | 25.0** | 50.0 | 7.50 |

*Aqueous solution of hydrochloric acid contains 13 drops of a 38 percent by weight aqueous solution of hydrochloric acid in 100 milliliters of water.
**Aqueous solution of hydrochloric acid contains 8 drops of a 38 percent by weight aqueous solution of hydrochloric acid in 100 milliliters of water.

TABLE II

| | CROSS-LINKING AGENT- AND ALKALINE MATERIAL-CONTAINING SOLUTIONS | | | | |
|---|---|---|---|---|---|
| Jar Number | Volume Water (milliliters) | Concentration NaAlO$_2$ (percent by weight) | Volume Aqueous Solution of NaOH (milliliters) | Total Volume (milliliters) | pH |
| 12 | 19.0 | 0.128 | 0.5 | 19.5 | 9.65 |
| 13 | 11.5 | 0.208 | 0.5 | 12 | 10.03 |
| 14 | 11.0 | 0.208 | 1.0 | 12 | 10.08 |
| 15 | 19.0 | 0.119 | 2.0 | 21 | 10.08 |
| 16 | 6.0 | 0.385 | 0.5 | 6.5 | 10.34 |
| 17 | 14.0 | 0.156 | 2.0 | 16 | 10.49 |
| 18 | 4.5 | 0.50 | 0.5 | 5 | 10.56 |
| 19 | 20.5 | 0.10 | 4.5 | 25 | 11.56 |
| 20 | 0 | 0.385 | 6.5 | 6.5 | 12.68 |
| 21 | 0 | 0.50 | 5.0 | 5.0 | 12.75 |
| 22 | 0 | 2.5 | 1.0 | 1.0 | 12.80 |

TABLE III

| AQUEOUS SOLUTIONS CONTAINING POLYMER, CROSS-LINKING AGENT AND ALKALINE MATERIAL | | | | |
|---|---|---|---|---|
| Example Number | Mixture of Jars Numbered | Total Volume (milliliters) | Final pH | Visual Appearance |
| 1 | 6 and 14 | 50 | 9.10 | gel formed |
| 2 | 9 and 18 | 50 | 9.10 | gel formed |
| 3 | 7 and 16 | 50 | 9.12 | gel formed |
| 4 | 11 and 22 | 51 | 9.14 | gel formed |
| 5 | 3 and 12 | 50 | 9.14 | ungelled |
| 6 | 5 and 13 | 50 | 9.16 | gel formed |
| 7 | 2 and 15 | 50 | 9.42 | ungelled |
| 8 | 4 and 17 | 50 | 9.51 | ungelled |
| 9 | 1 and 19 | 50 | 9.84 | ungelled |
| 10 | 8 and 20 | 50 | 10.14 | ungelled |
| 11 | 10 and 21 | 50 | 10.86 | ungelled |

EXAMPLE 12

Permeability reduction in a sand-packed column is investigated under conditions wherein the pH of an injected polymer-containing solution remains above about 9 throughout the investigation and should not reduce permeability significantly. A 21 foot long section of Schedule 40 steel pipe having a 2-inch inside diameter is packed with Nevada 130 sand having a particle size range from about 100 to 270 mesh (U.S. Standard Sieve Series). 4 inches of Nevada 47 mesh sand is packed on both ends of the Nevada 130 sand column and a 100 mesh wire screen is positioned at each end of the column to prevent shifting of the sand. The pipe is tapped with eight pressure gauges spaced 30 inches apart along its length. The pipe is wrapped with two 25 foot long heating tapes each controlled by a temperature controller having a thermocouple placed between the heating tape and the pipe. A third thermocouple going through one of the pressure taps is embedded in the sand to determine the actual temperature inside the pipe. The pipe is wrapped with a 3-inch layer of fiberglass insulation to reduce heat loss.

The pipe is evacuated of air by pulling a vacuum on the outlet and closing the inlet. After 1 hour, the inlet is opened and carbon dioxode gas is flowed through the pipe for 10 minutes to further the evacuation of air. Water is then flowed into the pipe until the pipe is saturated with water. 5 grams of sodium hydroxide is dissolved in 1,000 milliliters water. The resulting solution, which has a pH of 12.85, is placed in a 1,100 milliliter pressure vessel. A polymer solution is prepared by mixing 20.8 milliliters Cyanatrol 960-S, the partially hydrolyzed polyacrylamide polymer described above, in 1,250 milliliters water. An aqueous solution containing both a cross-linking agent and an alkaline material is prepared by mixing 12.5 grams of sodium hydroxide and 2.5 grams of sodium aluminate with 1,250 milliliters water. The polymer solution and the aqueous solution containing a cross-linking agent and alkaline material are mixed together and placed in a 3,000 milliliter pressure vessel.

The sand column is heated to 150° F. and the following fluids are sequentially injected into the column:
1. Over an 8 hour period at 60 p.s.i.g., there is injected 500 milliliters of the aqueous solution of sodium hydroxide followed by 1,700 milliliters of the aqueous solution containing polymer, cross-linking agent and alkaline material, followed by 200 milliliters of the aqueous solution of sodium hydroxide.
2. The test is shut down for 16 hours.
3. Over a 24 hour period at 60 p.s.i.g., there is injected 775 milliliters of the aqueous solution containing polymer, cross-linking agent and alkaline material.
4. Over an 8 hour period at 60 p.s.i.g., there is injected 175 milliliters of the aqueous solution of sodium hydroxide followed by 500 milliliters of water.
5. The pressure is lowered to 20 p.s.i.g. and 950 milliliters of water are injected over a 16 hour period.
6. The pressure is raised to 50 p.s.i.g. and 750 milliliters of water are injected over an 8 hour period.
7. The pressure is lowered to 5 p.s.i.g. and 600 milliliters of water are injected over a 16 hour period while samples of the effluent fluid are periodically collected.
8. The pressure is raised to 50 p.s.i.g. and 875 milliliters of water are injected over an 8 hour period while continuing to take samples of the effluent fluid.

An examination of the effluent fluid shows that the aqueous solution containing polymer, cross-linking agent and alkaline material retains its high pH of about 12 after passing through the column and moves through the column without cross-linking. This indicates that as long as the polymer solution remains at a high pH, it can be moved a considerable distance through a porous medium.

A determination of the flow rate of water through the sand-packed column before and after the injection of the fluids described in this example shows that the flow rate is decreased by a factor of 60. This flow rate reduction is due to the residual resistance factor of the polymer only.

Carbon dioxide is bubbled through several samples of the effluent from the column which contains an aqueous solution of polymer, cross-linking agent and alkaline material and have a pH of at least 12. It is found that when the pH is lowered to about 9 by the carbon dioxide, a gel forms indicating that the polymer is cross-linked.

EXAMPLE 13

Using the same apparatus described in Example 12 above and the same type of sand-packed column as well as the same procedures for evacuation of air and saturating the column with water, an additional test is made using a lower concentration of sodium hydroxide in the system. In this example, the pH of an injected polymer-containing solution should fall below about 9 during the test, a gel should form and cause a significant reduction in permeability. A first aqueous solution of an alkaline material and a cross-linking agent is prepared by admixing 0.6 grams of sodium hydroxide and 0.3 grams of sodium aluminate in 300 milliliters of water. The resulting solution has a pH of 12.24 and contains 0.2 percent by weight sodium hydroxide and 0.1 percent by weight sodium aluminate. A second aqueous solution of an alkaline material and a cross-linking agent is prepared by admixing 2.8 grams of sodium hydroxide and 1.4 grams of sodium aluminate in 700 milliliters of water. An aqueous polymer solution is prepared by admixing 12 milliliters of Cyanatrol 960-S partially hydrolyzed polyacrylamide polymer and 700 milliliters of water. The second aqueous solution of an alkaline material and a cross-linking agent is then admixed with the polymer solution to form a solution having a pH of 11.32 and containing 0.25 percent by weight of Cyanatrol 960-S, 0.2 percent by weight of sodium hydroxide and 0.1 percent by weight of sodium aluminate.

The sand-packed column is heated to 150° F. and the following fluids are sequentially injected therein:
1. Over a period of 48 hours and at an injection pressure of 5 p.s.i.g., there is injected 200 milliliters of the first aqueous solution of an alkaline material and a cross-linking agent followed by 1,355 milliliters of the aqueous solution containing a polymer, an alkaline material and a cross-linking agent, followed by 50 milliliters of the first aqueous solution of an alkaline material and a cross-linking agent.
2. Over a period of 24 hours, there is injected 750 milliliters of a second batch of the aqueous solution containing a polymer, an alkaline material and a cross-linking agent. The injection pressure for the first 8 hours is 35 p.s.i.g. after which the injection pressure is lowered to 10 p.s.i.g. At the end of the 24 hour period, the flow rate is 0.1 milliliter per minute or 0.65 foot per day.
3. Over a period of 24 hours and at an injection pressure of 35 p.s.i.g., there is injected 400 milliliters of water containing 0.1 percent by weight of ammonium thiocyanate as a tracer.
4. Over a period of 96, hours, there is injected 1,500 milliliters of water containing 0.1 percent by weight of ammonium thiocyanate. For the first 8 hours, an injection pressure of 10 p.s.i.g. is used. For the remainder of the period, the pressure is lowered to 5 p.s.i.g. At a pressure of 5 p.s.i.g., the flow rate through the core is 0.06 milliliter per minute or 0.39 foot per day.
5. Over a period of 70 hours and at an injection pressure of 5 p.s.i.g., there is injected 646 milliliters of water containing 0.1 percent by weight of ammonium thiocyanate. The flow rate is 0.04 milliliter per minute or 0.26 foot per day.

6. Just prior to shutting down over a period of 2 hours and at an injection pressure of 30 p.s.i.g., there is injected 54 milliliters of water containing 0.1 percent by weight of ammonium thiocyanate. The flow rate is 0.45 milliliter per minute or 2.93 feet per day.

When the volume of fluids injected into the test apparatus indicates that polymer should be present in the effluent, samples of the effluent are periodically taken and examined. When polymer first appears, the pH of the effluent is 8.69. This is below the pH at which a plug will begin to form. When carbon dioxide is bubbled through the polymer-containing effluent to lower the pH still further, the sample remains ungelled. This indicates that no cross-linking agent is present in the effluent. The readings on the pressure gauges indicate that some plugging occurs. The pressure in p.s.i.g. along the sand-packed column from the injection end to the outlet end is 30 at gauges 1 to 3, 25 at gauge 4, 20 at gauge 5, 15 at gauge 6 and 0 at gauges 7 and 8. The greatest pressure drop, which occurs between gauges 6 and 7, indicates the location of the principal plug. Thus, the plug forms between 15 and 17.5 feet from the injection end of the 21 foot long pipe.

Since the pH of the polymer-containing solution is 11.32 when injected, the pH of the effluent gradually increases from 8.69 to 9.84 at the end of the test. No sodium thiocyanate tracer is produced during this test. This indicates that there is no appreciable channeling of fluids through the test apparatus.

A determination of the flow rate of water through the sand-packed column before and after the injection of the fluids described in this example shows that the flow rate is decreased by a factor of 375. To form a firmer plug, it would be necessary to decrease the concentration of alkaline material still further.

While particular embodiments of the invention have been described, it will be understood, of course, that the invention is not limited thereto since many modifications can be made and it is intended to include within the invention such modifications as are within the scope of the claims.

The invention having thus been described, we claim:

1. A method for reducing the permeability of the higher permeability zones of a subterranean reservoir having heterogeneous permeability penetrated by at least one well comprising injecting through a well and into said reservoir about 2 to 800 barrels per vertical foot of reservoir to be treated of an aqueous solution or dispersion of (1) a water-soluble or water-dispersible polymer selected from the group consisting of acrylic acid-acrylamide copolymers, polyacrylamides, partially hydrolyzed polyacrylamides, polyalkyleneoxides, carboxyalkylcelluloses, hydroxyethylcelluloses and heteropolysaccharides obtained by the fermentation of starch-derived sugar, (2) a cross-linking agent for the polymer comprising a water-soluble salt of a polyvalent cation which reacts in solution to form a colloidal hydroxide selected from the group consisting of an alkali metal or ammmonium aluminate or tungstate, and (3) an amount of a water-soluble alkaline material selected from the group consisting of alkali metal and ammonium hydroxides, alkali metal silicates, and alkali metal phosphates sufficient to raise the pH of the overall aqueous solution or dispersion to about 10 or above, passing the said aqueous solution or dispersion through the reservoir until the pH has fallen to about 9 or below, and shutting in the well until the reservoir permeability has been reduced.

2. The method defined in claim 1 wherein the alkaline material is employed in a concentration of about 0.1 to 0.5 parts by weight of the aqueous solution or dispersion.

3. The method defined in claim 1 wherein the alkaline material is sodium hydroxide.

4. The method defined in claim 1 wherein the polymer is employed at a concentration of about 0.0025 to 1 parts by weight of the aqueous solution or dispersion.

5. The method defined in claim 1 wherein the polymer is employed at a concentration of about 0.02 to 0.5 parts by weight of the aqueous solution or dispersion.

6. The method defined in claim 1 wherein the cross-linking agent is employed at a concentration of about 0.0005 to 1 part by weight of the aqueous solution or dispersion.

7. The method defined in claim 1 wherein the cross-linking agent is employed at a concentration of about 0.01 to 0.2 part by weight of the aqueous solution or dispersion.

8. The method defined in claim 1 wherein the said polymer is a partially hydrolyzed polyacrylamide.

9. The method defined in claim 1 wherein the alkali metal aluminate is sodium aluminate.

10. The method defined in claim 1 wherein the reduction in permeability occurs about 20 feet or more away from the well.

11. The method defined in claim 1 wherein the injection of the said aqueous solution or dispersion is followed by injection of an acid gas selected from the group consisting of carbon dioxide, hydrogen sulfide, sulfur dioxide and sulfur trioxide.

12. A method for reducing the permeability of the higher permeability zones of a subterranean reservoir having heterogeneous permeability penetrated by at least one well, said reduction in permeability occurring about 20 feet or more away from the well, comprising injecting through the well and into said reservoir about 2 to 800 barrels per vertical foot of reservoir to be treated of an aqueous solution or dispersion of (1) about 0.0025 to 1 part by weight of a water-soluble or water-dispersible polyacrylamide or partially hydrolyzed polyacrylamide, (2) about 0.01 to 0.2 part by weight of an alkali metal or ammonium aluminate cross-linking agent, and (3) an amount of an alkali metal or ammonium hydroxide sufficient to raise the pH of the overall aqueous solution or dispersion to about 10 or above, and injecting a drive fluid to push the said aqueous solution or dispersion out into the reservoir away from the well until the pH of at least the leading edge of the aqueous solution or dispersion drops to 9.2 or below.

13. The method defined in claim 12 wherein the alkali metal or ammonium hydroxide is employed in a concentration of about 0.1 to 0.5 parts by weight of the aqueous solution or dispersion.

14. The method defined in claim 12 wherein the alkali metal hydroxide is sodium hydroxide.

15. The method defined in claim 12 wherein the alkali metal aluminate is sodium aluminate.

16. In a method for the recovery of oil from a subterranean oil reservoir having strata of heterogeneous permeability and which is in communication with at least one producing well and at least one injection well, which method includes injection into the reservoir of a secondary or a tertiary recovery fluid via an injection well and recovery of oil via a production well, the improvement which comprises, at some point during the injection of the secondary or tertiary recovery fluid, introducing into the heterogeneous reservoir from about 2 to about 800 barrels per vertical foot of strata to be treated of a mixture of an aqueous solution or dispersion of (1) a water-soluble or water-dispersible polymer selected from the group consisting of acrylic acid-acrylamide copolymers, polyacrylamides, partially hydrolyzed polyacrylamides, polyalkyleneoxides, carboxyalkylcelluloses, hydroxyethylcelluloses and heteropolysaccharides obtained by the fermentation of starch-derived sugar, (2) a cross-linking agent for the polymer comprising a water-soluble salt of a polyvalent cation which reacts in solution to form a colloidal hydroxide selected from the group consisting of an alkali metal or ammonium aluminate or tungstate, and (3) an amount of a water-soluble alkaline material selected from the group consisting of alkali metal and ammonium hydroxides, alkali metal silicates, and alkali metal phosphates sufficient to raise the pH of the overall aqueous solution or dispersion to about 10 or above, passing the said aqueous solution or dispersion through the reservoir until the Ph has fallen to about 9 or below, and shutting in the well until the reservoir permeability has been reduced.

17. The method defined in claim 16 wherein the alkaline material is employed in a concentration of about 0.1 to 0.5 parts by weight of the aqueous solution or dispersion.

18. The method defined in claim 16 wherein the alkaline material is sodium hydroxide.

19. The method defined in claim 16 wherein the polymer is employed at a concentration of about 0.0025 to 1 parts by weight of the aqueous solution or dispersion.

20. The method defined in claim 16 wherein the polymer is employed at a concentration of about 0.02 to 0.5 parts by weight of the aqueous solution or dispersion.

21. The method defined in claim 16 wherein the cross-linking agent is employed at a concentration of about 0.0005 to 1 part by weight of the aqueous solution or dispersion.

22. The method defined in claim 16 wherein the cross-linking agent is employed at a concentration of about 0.01 to 0.2 part by weight of the aqueous solution or dispersion.

23. The method defined in claim 16 wherein the said polymer is a partially hydrolyzed polyacrylamide.

24. The method defined in claim 16 wherein the alkali metal aluminate is sodium aluminate.

25. In a method for the recovery of oil from a subterranean oil reservoir having strata of heterogeneous permeability and which is in communication with at least one producing well and at least one injection well, which method includes injection into the reservoir of a secondary or a tertiary recovery fluid via an injection well and recovery of oil via a production well, the improvement which comprises, at some point during the injection of the secondary or tertiary recovery fluid, introducing into the heterogeneous reservoir from about 2 to about 800 barrels per vertical foot of strata to be treated of a mixture of an aqueous solution or dispersion containing (1) about 0.02 to 0.5 parts by weight of a partially hydrolyzed polyacrylamide, (2) about 0.01 to 0.2 part by weight of sodium aluminate cross-linking agent, and (3) about 0.1 to 0.5 part by weight of sodium hydroxide, passing the said aqueous solution or dispersion through the reservoir until its pH has fallen to about 9 or below, and shutting in the well until the reservoir permeability has been reduced.

* * * * *